Patented Aug. 23, 1949

2,479,671

UNITED STATES PATENT OFFICE 2,479,671

SYNTHETIC RUBBER COMPOSITIONS

Samuel J. Cohen, Rochester, and Walter E. Scheer, Jackson Heights, N. Y., said Scheer assignor to said Cohen No Drawing. Application August 13, 1946, Serial No. 690,324

4 Claims. (Cl. 260—28.5)

This invention relates to a rubber composition including an incompletely but substantially dehydrochlorinated, originally chlorinated paraffin hydrocarbon and a synthetic rubber selected from the group consisting of the commercial varieties of butadiene-acrylonitrile polymers, butadiene-styrene polymers, and polymerized chloroprene such as that known as neoprene.

The invention is particularly useful in connection with the butadiene-acrylonitrile polymers compositions and for that reason will be first illustrated by description in connection with such material.

Our dehydrochlorinated material, derived from chlorinated paraffin wax, for instance, by removal of about one-fourth to three-fourths of the chlorine initially present, is freely soluble in hydrocarbon solvents such as toluol and naphtha. We have found, however, that incorporating this dehydrochlorinated material and a sulfur curing agent into butadiene-acrylonitrile polymers and then curing the composition gives a product which swells actually less when soaked in hydrocarbon solvents than does the same synthetic rubber composition to which none of the original hydrocarbon-soluble dehydrochlorinated material has been added.

Furthermore, the use of the dehydrochlorinated material softens the composition and promotes ease of milling and mixing during the making of the rubber compound; after the curing is effected, on the other hand, the compound with the added dehydrochlorinated material has a higher modulus for 300% elongation and faster rate of curing than does the originally stiffer compound made without the use of the dehydrochlorinated material.

We have found also that chlorinated material, which is ordinarily unstable due to the tendency of chlorine or hydrogen chloride to split out, is stabilized to a large extent by the dehydrochlorination process and further stabilized by the co-curing in contact with the synthetic rubber and the curing agent. As a result, the resulting cured compound shows no detectable deterioration in aging tests, all as will be described in greater detail.

In addition our dehydrochlorinated material serves as a plasticizer but gives a cured product having much greater tensile strength than shown by comparable composition including other plasticizers.

Briefly stated, the invention comprises the herein described method and the compositions including a synthetic rubber selected from the group consisting of butadiene-acrylonitrile polymers, butadiene-styrene polymers, and neoprene and an incompletely but substantially dehydrochlorinated originally chlorinated paraffin hydrocarbon. In the preferred embodiment, the invention includes the composition in cured condition, the proportion of chlorine in the dehydrochlorinated material corresponding to approximately one-fourth to three-fourths of a chlorine atom for each 2 to 6 carbon atoms present in the dehydrochlorinated material.

The dehydrochlorinated material to be used in our synthetic rubber compositions is made as described and is in fact any one of the incompletely dehydrochlorinated products described in our copending application for U. S. Patent Serial No. 678,678, filed by us on June 22, 1946, and now abandoned, for Dehydrochlorination of chlorinated hydrocarbons.

The dehydrochlorinated material selected should contain 6 to 27 carbon atoms to the molecule. After the dehydrochlorination is effected the original content of chlorine may be calculated by determining the remaining chlorine content and increasing this remaining chlorine by calculation on the basis that, for each double bond in the product, as determined by iodine number, there has been removed one chlorine during the dehydrochlorination, all as described in the said copending application.

We have found that discontinuing the dehydrochlorination of chlorinated hydrocarbons before the last 25% or so of the chlorine is removed gives a product in which the most unstable chlorine compounds have been decomposed and in which there is a minimum of secondary changes which, when they occur, result in decreasing the degree of unsaturation in proportion to the percentage of chlorine removed. In other words, after a certain stage in the dehydrochlorination is reached, formation of ring compounds and other by-products offsets to a large extent the effect of further chlorine removal upon the degree of unsaturation. Such further chlorine removal gives compounds that not only are much lower in weight than the chlorine compounds decomposed but also show no corresponding increase if any in the unsaturation as measured by iodine number.

We have now found that the incompletely dehydrochlorinated hydrocarbons are miscible with the synthetic rubbers described. We have found also that, when compositions including the synthetic rubber and dehydrochlorinated material in the proportion of about 10 to 60 parts of the latter to 100 of the former, are vulcanized, then the dehydrochlorinated material not only loses its property of absorbing toluol and like liquids that were excellent solvents for the dehydrochlorinated material initially but actually decreases slightly the proportion of such liquids absorbed by 100 parts of the synthetic rubber composition when immersed in the liquids.

The dehydrochlorinated, sometimes called dechlorinated, material used is one made by removing a substantial part but not all of the original chlorine content of the chlorinated paraffin hydrocarbon. This chlorine comes out mostly in the form of hydrogen chloride. A suitable material is made by first chlorinating paraffin wax to a chlorine content of about 25% to 70%, preferably about 30% to 50% and for best commercial results 40% to 45%. Other hydrocarbons that may be used in place of the paraffin are liquid hydrocarbons as, for example, gasoline or kerosene or any sharply fractionated liquid cut thereof.

The originally chlorinated product is then dehydrochlorinated but there is left in the product at least approximately one-fourth of the chlorine introduced initially. Dehydrochlorinated material containing about 10% to 36% of chlorine and having unsaturation corresponding to an iodine number of 75 to 150 have been found to be particularly satisfactory. Leaving in of this substantial part of the original chlorine gives, in the finished cured synthetic rubber composition, the desirable combination of properties shown in subsequent tables, these properties including a low amount of swelling in hydrocarbon solvents and a relatively flat curve relating the tensile strength to the time of cure, in other words a rapid cure.

The invention and the numerical magnitude of the advantages gained with representative ones of our new compositions will be illustrated in greater detail in the following specific examples.

*Example 1*

A rubber compound or mix was made with Buna-N synthetic rubber and the dehydrochlorinated material resulting from chlorinating paraffin scale wax to a chlorine percentage of 42% to 43% and then dehydrochlorinating to a material containing 25% of chlorine and having an iodine number of 125.

The whole composition made was as follows:

| Ingredient | Parts by Weight |
|---|---|
| Butadiene-acrylonitrile polymers | 100 |
| Dehydrochlorinated material | 25 |
| Zinc Oxide | 5 |
| Stearic Acid | 1 |
| Benzothiazyl Disulfide | 1.5 |
| Channel Black | 58 |
| Sulfur | 2.1 |

A control sample was made of the same composition except that in the control the channel black was decreased to 50 parts and the sulfur to 1.5 parts and no dehydrochlorinated material was used.

The composition with the dehydrochlorinated material present and also the control were separately mixed and milled in manner usual in compounding rubber compositions.

The mixed and milled materials were then cured at 287° F. for various periods of time, although curing under conditions that are conventional in the rubber art is satisfactory.

Cured test slabs were then subjected to usual physical tests with the following results for specimens cured from 30 to 75 minutes.

| | Control | Dehydrochlorinated Material Used |
|---|---|---|
| *Cure 30 min.* | | |
| Modulus for 300% elongation (p. s. i.) | 860 | 1,117 |
| Tensile strength (p. s. i.) | 2,620 | 2,933 |
| Elongation at break, per cent | 640 | 600 |
| Shore Hardness | 70 | 66 |
| *Cure 45 min.* | | |
| Modulus for 300% elongation (p. s. i.) | 1,405 | 1,525 |
| Tensile strength (p. s. i.) | 3,090 | 2,930 |
| Elongation, per cent | 525 | 490 |
| Shore Hardness | 73 | 70 |
| *Cure 60 min.* | | |
| Modulus for 300% elongation (p. s. i.) | 1,590 | 1,993 |
| Tensile strength (p. s. i.) | 3,175 | 3,073 |
| Elongation, per cent | 475 | 450 |
| Shore Hardness | 76 | 71 |
| *Cure 75 min.* | | |
| Modulus for 300% elongation (p. s. i.) | 1,635 | 2,255 |
| Tensile strength (p. s. i.) | 3,030 | 2,887 |
| Elongation, per cent | 425 | 385 |
| Shore Hardness | 78 | 72 |

It is to be noted that the dehydrochlorinated material accelerates the cure, the modulus and tensile strength for the composition including the dehydrochlorinated material being 257 and 313 pounds higher, respectively, after the 30 minutes' cure than in the control sample, although the Shore hardness number is somewhat lower at all cures than for the control material containing no dehydrochlorinated product.

The swelling of typical specimens in solvents is actually less in the composition including the dehydrochlorinated material than in the control sample; this in spite of the fact that the dehydrochlorinated material is originally soluble in the solvents. This difference is shown in the following table:

| Liquid | Volume Increase, Per cent of Original, After Swelling in Solvents for 96 Hours at 70° F. | |
|---|---|---|
| | Control Material | Composition Including Dehydrochlorinated Material |
| | Per cent | Per cent |
| In toluol | 126 | 84 |
| In gasoline | 7.4 | 5.6 |

For comparison, additional compositions of the kind shown above were made by the substitution of 25 parts of the dehydrochlorinated material by 25 parts of dibutyl phthalate and 25 parts of dioctyl phthalate, respectively, the sulfur in each of these compositions being 1.5 parts and the channel black being 50 parts.

In the 30 minutes' cure, for instance, the modulus for 300% elongation, with both the dibutyl phthalate and the dioctyl phthalate as modifiers, was approximately half or less than half the modulus with the dehydrochlorinated material used, the figures for the dibutyl phthalate and dioctyl phthalate, respectively, being 425 pounds and 560 pounds. Also both the dibutyl phthalate and dioctyl phthalate increased the swelling in toluol to nearly twice the swelling found with the composition including the dehydrochlorinated material. The numerical values for the swelling of these three compositions are shown below.

| Modifier Used | Swelling in Solvents, 96 Hrs. at 70° F. | |
|---|---|---|
| | In Toluol | In Gasoline |
| | Percent | Percent |
| Dehydrochlorinated material | 84 | 5.6 |
| Dibutyl phthalate | 153 | 6.2 |
| Dioctyl phthalate | 160 | 6.8 |

In like manner the extraction by solvents is much less when the modifier or added material present is the dehydrochlorinated originally chlorinated hydrocarbon, data for extraction in gasoline for one week being shown below.

Plasticizer: Loss in weight due to extraction

Dehydrochlorinated
material _____percent__ 5.1
Dibutyl phthalate _____do____ 13.9
Dioctyl phthalate _____do____ 12.3

Aging tests show another advantage of the dehydrochlorinated material, results for the several compositions after aging 7 days at 70° C. being shown in the following table.

| Modifier | None | De-HCl Material | Dibutyl Phthalate | Dioctyl Phthalate |
|---|---|---|---|---|
| *30 min. Cure* | | | | |
| Modulus for 300% elongation (p. s. i.) | 2,280 | 2,167 | 968 | 1,110 |
| Tensile strength (p. s. i.) | 3,405 | 2,825 | 2,760 | 2,838 |
| Elongation, Percent | 390 | 375 | 590 | 535 |
| Shore Hardness | 77 | 70 | 57 | 60 |
| *45 min. Cure* | | | | |
| Modulus for 300% elongation (p. s. i.) | 3,030 | 2,407 | 1,138 | 1,245 |
| Tensile strength (p. s. i.) | 3,175 | 2,650 | 2,890 | 2,934 |
| Elongation, Percent | 300 | 325 | 550 | 485 |
| Shore Hardness | 79 | 73 | 59 | 62 |
| *60 min. Cure* | | | | |
| Modulus for 300% elongation (p. s. i.) | Broke | 2,720 | 1,680 | 1,768 |
| Tensile strength (p. s. i.) | 2,770 | 2,794 | 2,845 | 2,845 |
| Elongation, Percent | 285 | 310 | 400 | 375 |
| Shore Hardness | 80 | 74 | 62 | 65 |
| *75 min. Cure* | | | | |
| Modulus for 300% elongation (p. s. i.) | Broke | 2,675 | 1,770 | 1,845 |
| Tensile strength (p. s. i.) | 2,689 | 2,675 | 2,708 | 2,775 |
| Elongation, Percent | 225 | 300 | 375 | 350 |
| Shore Hardness | 83 | 74 | 63 | 66 |

Details of curing and other operations that are not given are conventional. It should be noted, however, that the proportions of the curing agent and pigment to the synthetic rubber are increased to advantage when the plasticizer used is the dehydrochlorinated material.

Thus, the sulfur is increased from 1.5 parts to 100 of butadiene-acrylonitrile polymers up to 2.1 parts. In general the increase in sulfur content is about 2.5 parts for 100 parts of the dehydrochlorinated material used. This increased requirement of sulfur is due to the fact that sulfur is needed to combine with the dehydrochlorinated material in the curing operation. The result is covulcanization of the curing agent and plasticizer.

The proportion of the channel black or other conventional pigment is also increased. In the case of the channel black, the increase is about 2% of the conventional proportion for each 3 parts of the dehydrochlorinated material used. This increase in the pigment or filler requirement is due to the fact that the incompletely dehydrochlorinated material described herein undergoes covulcanization and increases by its own weight the total of vulcanized material throughout which the pigment or filler is distributed.

In the composition of this example the ingredients that are conventional may be substituted by other conventional ingredients for the same purpose. Thus there may be used various curing agents, accelerators, and pigment compositions, proportions of all ingredients being any that are conventional except that the proportions of curing agent and filler of pigment are preferably increased as stated.

*Example 2*

The procedure of Example 1 is followed with the exception that butadiene-styrene polymers is substituted on a pound for pound basis for the butadiene-acrylonitrile polymers.

The compound during the stage of mixing is persistently tacky. It is free from "nerve" which means that the processing on calender rolls or in mixers is easy. After curing, however, the added dehydrochlorinated material is practically non-volatile and non-extractable by solvents for the dehydrochlorinated material originally added.

*Example 3*

The procedure of Example 1 is followed except that polymerized chloroprene (neoprene) is substituted on an equal weight basis for the butadiene-acrylonitrile polymers of Example 1.

With the neoprene, as with the other synthetic rubbers, our new modifier facilitates mixing and milling. It gives a low cost extension of the synthetic rubber, a milled and cured composition in which there is uniformity and thoroughness of blending of the synthetic rubber and the dehydrochlorinated chlorinated paraffin hydrocarbon, and effective plasticization without substantial adverse effect on the tensile strength.

The products of all of the examples are useful rubber compositions. The addition of the heavy partially dehydrochlorinated material provides not only an improved but also a less costly rubber composition.

It will be understood also that it is intended to cover all changes and modifications of the examples of the invention herein chosen for the purpose of illustration which do not constitute departures from the spirit and scope of the invention.

What we claim is:

1. A composition of matter comprising a synthetic rubber, selected from the group consisting of butadiene-acrylonitrile polymers and butadiene-styrene polymers, and an incompletely but substantially dehydrochlorinated chlorinated paraffin hydrocarbon containing 6 to 27 carbon atoms to the molecule, containing 10% to 36% of chlorine, having an iodine number of 75 to 150, and being in the proportion of 10 to 60 parts by weight for 100 parts of the synthetic rubber, the said composition being in sulfur-vulcanized condition.

2. A composition as described in claim 1, the synthetic rubber being butadiene-acrylonitrile polymers.

3. A composition as described in claim 1, the synthetic rubber being butadiene-styrene polymers.

4. The method of making a rubber-like composition which comprises forming a mixture of 100 parts by weight of a synthetic rubber, selected from the group consisting of butadiene-acrylonitrile polymers and butadiene-styrene polymers, 10 to 60 parts of an incompletely but substantially dehydrochlorinated chlorinated paraffin hydrocarbon containing 6 to 27 carbon atoms to the molecule, containing 10% to 36% of chlorine and having an iodine number of 75 to 150, and a sulfur curing agent and then curing the mixture so that the synthetic rubber and the dehydrochlorinated material are cured at the same time.

SAMUEL J. COHEN.
WALTER E. SCHEER.

REFERENCES CITED

The following references are of record in the file of this patent:

UNITED STATES PATENTS

| Number | Name | Date |
|---|---|---|
| Re. 21,572 | Ott | Sept. 17, 1940 |
| 2,273,983 | Ott | Feb. 24, 1942 |

FOREIGN PATENTS

| Number | Country | Date |
|---|---|---|
| 518,718 | Great Britain | Mar. 6, 1940 |

OTHER REFERENCES

Garvey, Ind. and Eng. Chem., vol. 36, pp. 209–211, March 1944.